United States Patent [19]

Roberts et al.

[11] Patent Number: 4,746,499

[45] Date of Patent: * May 24, 1988

[54] METHOD OF DECONTAMINATING A LOCATION CONTAINING PYROPHORIC $P_4$-CONTAMINATION

[75] Inventors: Auston K. Roberts, Chino; William E. Trainer, Anaheim, both of Calif.; David L. Biederman, Columbia, Tenn.

[73] Assignee: Stauffer Chemical Company, Westport, Conn.

[*] Notice: The portion of the term of this patent subsequent to Aug. 11, 2004 has been disclaimed.

[21] Appl. No.: 78,426

[22] Filed: Jul. 27, 1987

Related U.S. Application Data

[63] Continuation-in-part of Ser. No. 894,529, Aug. 8, 1986, Pat. No. 4,686,094.

[51] Int. Cl.$^4$ .................... C01B 25/01; C01B 25/02; C01B 25/04
[52] U.S. Cl. ...................................... 423/322; 423/323
[58] Field of Search ................................ 423/322, 323

[56] References Cited

U.S. PATENT DOCUMENTS 4,686,094 8/1987 Roberts et al. .................. 423/322

Primary Examiner—Gregory A. Heller
Attorney, Agent, or Firm—Richard P. Fennelly

[57] ABSTRACT

A method of decontaminating a location containing pyrophoric $P_4$-contamination is described. It comprises bringing to the location a portable vehicle which comprises at least one of the necessary items needed to accomplish the contacting of the $P_4$-contaminated material, while it is under a protective blanket of a nonflammable fluid, with an oxygen-containing gas, such as air, pure oxygen, or mixtures thereof. The portable vehicle may contain, for example, a scrubber, a source of oxygen, a pump, means to convey the oxygen-containing gas to the $P_4$-contaminated material, and means to convey any effluent resulting from the treatment to suitable recovery or treatment apparatus.

4 Claims, 1 Drawing Sheet

METHOD OF DECONTAMINATING A LOCATION CONTAINING PYROPHORIC P₄-CONTAMINATION

RELATED APPLICATION

This application is a continuation-in-part of copending U.S. Ser. No. 894,529, filed Aug. 8, 1986 entitled, "Treatment of Pyrophoric Elemental Phosphorus-Containing Material", now U.S. Pat. No. 4,686,094.

BACKGROUND OF THE PRESENT INVENTION

The above-identified copending application describes a method whereby pyrophoric $P_4$-containing material can be converted to a substantially less pyrophoric form while it is under a suitable blanketing layer of a nonflammable fluid (e.g., water or inert gas) with an oxygen-containing gas such as air, pure oxygen, or mixtures thereof. The action of the oxygen on the $P_4$-containing material while it is being blanketed with the nonflammable liquid reduces the pyrophoric nature of the $P_4$-material over time rendering it substantially less pyrophoric. Details concerning how the conversion of the pyrophoric $P_4$-material to a less pyrophoric form can be conducted in accordance with the invention described in that copending application are incorporated herein by reference.

SUMMARY OF THE PRESENT INVENTION

The present invention relates to a procedure for decontaminating a location which happens to contain pyrophoric $P_4$-contamination by the general process outlined in the above-mentioned copending application. The process is particularly directed to situations where the $P_4$-contamination is in a location such that it is inconvenient to transport the contaminated materials at the location to a suitable reactor to practice the process used in the foregoing, cross-referenced application. Hence, the present process comprises bringing to the location containing the $P_4$-contamination a portable vehicle which comprises at least one of the components needed to practice the aforementioned process. Included among these components is a scrubber, a source of oxygen, a pump, means to convey oxygen to the $P_4$-contaminated material, while such material is under a protective blanket of a nonflammable fluid, and means to convey the effluent resulting from the oxygen treatment of the $P_4$-contaminated material while it is blanketed with the nonflammable fluid to suitable treatment or recovery means.

DESCRIPTION OF THE DRAWINGS

The present invention will be more fully understood by reference to the drawings which form a portion of the present Specification wherein.

DETAILED DESCRIPTION OF THE PRESENT INVENTION

The present invention involves the decontaminating of a location containing pyrophoric $P_4$-contamination which comprises bringing to the location a portable vehicle which contains at least one of the necessary components for practicing the type of process described in the copending application. It is necessary and essential in regard to that process that the $P_4$-contaminated material is under an appropriate blanket of a nonflammable fluid, such as water, when the treatment with the oxygen-containing gas is used. In cases in which the pyrophoric $P_4$-containing material is in appropriate storage tanks or ponds already covered with water, a source of water need not be provided. In situations in which the $P_4$-contaminated material is buried underground, it may be necessary to flood the area prior to treatment with the oxygen-containing gas in order to avoid contact of air with the $P_4$-containing material which would give rise to spontaneous fire hazards.

Figure 1:
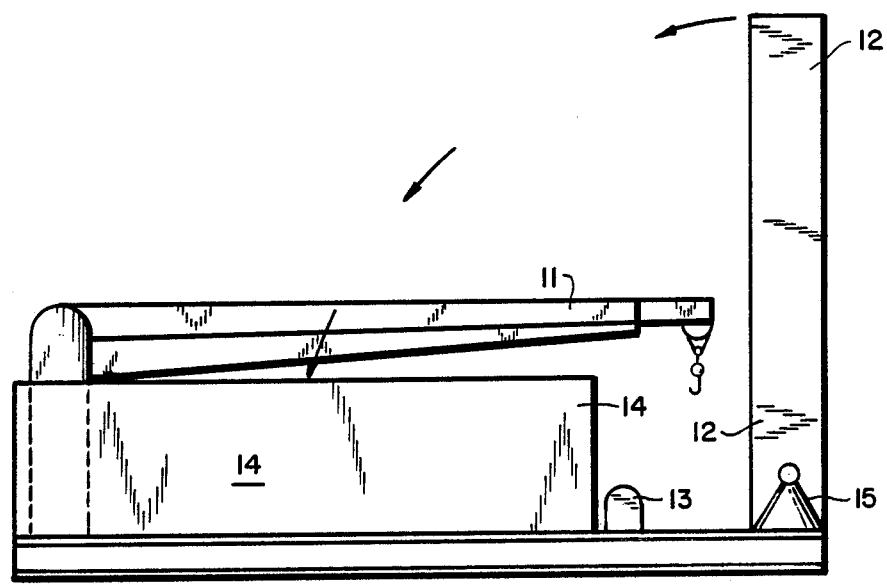
FIG. 1 is a side view of a suitable portable vehicle for use in conjunction with the present method.
Figure 2:
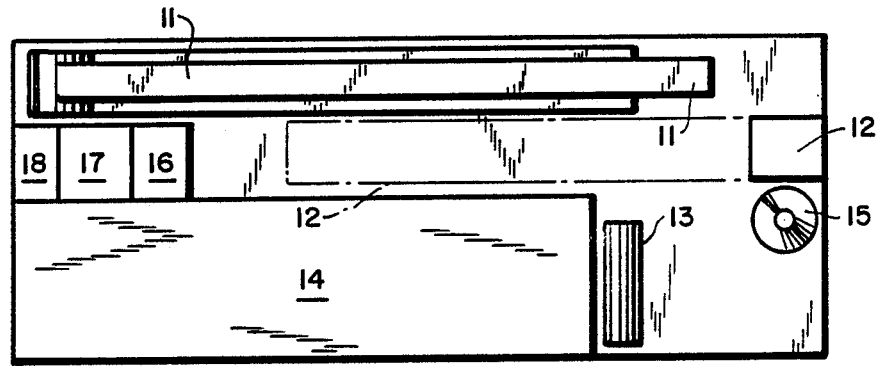
FIG. 2 is an overhead view of the type or portable vehicle shown in FIG. 1.

The type of apparatus shown in FIGS. 1 and 2 is merely representative of one type of apparatus that can be used. It is to be understood that the environment in which the $P_4$-containing material is placed will largely dictate what particular components the portable vehicle needs to have thereon. A wide variety of portable vehicles can be used in conjunction with the present method including wheeled vehicles, such as trucks and railcars, and these vehicles can be transported to the job site over roads, over rails, or by air, or by a combination of these transportation methods.

FIG. 1 illustrates a potential configuration for various components on a portable vehicle to be used in conjunction with the present invention. For example, a suitable gib crane 11 can be provided for the purpose of lifting and moving various components about, a scrubber 12 can be provided to effectively treat the effluent gases resulting from the process, and an oxygen tank 13 can also be provided to give a source of oxygen for use in the process. The oxygen-containing gas which is preferably employed with the method is substantially pure oxygen. If desired, a fabrication shop and material storage area 14 can also be provided on the portable vehicle. Other items which can be present include a circulating pump 15, an additional storage area 16, a boiler 17, and a generator 18.

The foregoing illustrates certain preferred embodiments of the present invention, but should not be construed in a limiting sense. The scope of protection that is sought is set forth in the claims which follow.

We claim:

1. A method of decontaminating a location containing pyrophoric $P_4$-contamination which comprises: (1) bringing to said location a portable vehicle which comprises at least one of the following: a scrubber, a source of an oxygen-containing gas, a pump, means to convey the oxygen-containing gas to the $P_4$-contaminated material, when said material is under a protective blanket of a nonflammable fluid, and means to convey the effluent resulting from the treatment of said $P_4$-contaminated material with the oxygen-containing gas, while it is blanketed with the nonflammable fluid, to either suitable treatment or recovery means; and (2) contacting the $P_4$ contamination, while it is under a protective blanket of a nonflammable fluid, with an oxygen-containing gas to thereby render it less pyrophoric.

2. A method as claimed in claim 1 wherein the vehicle is a wheeled vehicle.

3. A method as claimed in claim 1 wherein the oxygen-containing gas is substantially pure oxygen.

4. A method as claimed in claim 1 wherein the nonflammable fluid is water and the oxygen-containing gas is substantially pure oxygen.

* * * * *